United States Patent [19]

Suzuki

[11] Patent Number: 5,412,451
[45] Date of Patent: May 2, 1995

[54] PHOTOGRAPHIC PRINTING APPARATUS AND METHOD

[75] Inventor: Kenji Suzuki, Kanagawa, Japan
[73] Assignee: Fuji Photo Film Co., Ltd., Kanagawa, Japan
[21] Appl. No.: 984,475
[22] Filed: Dec. 2, 1992
[30] Foreign Application Priority Data
  Dec. 3, 1991 [JP] Japan .................................. 3-318850
[51] Int. Cl.$^6$ ........................ G03B 27/80; G03B 27/72
[52] U.S. Cl. ........................................ 355/68; 355/71; 355/77
[58] Field of Search ...................... 355/32, 35, 38, 68, 355/77, 71

[56] References Cited

U.S. PATENT DOCUMENTS

| | | | |
|---|---|---|---|
| 4,806,990 | 2/1989 | Tahara | 355/77 |
| 4,933,713 | 6/1990 | Tsuji et al. | 355/41 |
| 4,933,733 | 6/1990 | Shiota et al. | 355/71 X |

FOREIGN PATENT DOCUMENTS

| | | |
|---|---|---|
| 0308967 | 3/1989 | European Pat. Off. . |
| 0393661 | 10/1990 | European Pat. Off. . |
| 3819007 | 12/1988 | Germany . |
| 2278248 | 11/1990 | Japan . |

OTHER PUBLICATIONS

English language abstract of Japanese Patent Application No. 2-278248.

Primary Examiner—D. Rutledge
Attorney, Agent, or Firm—Sughrue, Mion, Zinn, Macpeak & Seas; Richard C. Turner; Eric Bram

[57] ABSTRACT

A photographic printing apparatus includes conveying rollers for conveying a film on which images are recorded, an image sensor for measuring image density, a device for determining printing conditions for each image based on a measured image density and for storing the printing conditions, a display for simulating an image to be printed onto photographic printing paper based on results of measurement by the image sensor and for displaying a simulated image, a reflecting mirror which is movable between a first position, at which the reflecting mirror guides light, which is irradiated from a light source and which passes through the film at a printing position, to the image sensor, and a second position, at which the reflecting mirror guides light, which passes through the film, to the photographic printing paper, and a control device. The control device controls the conveying rollers, the image sensor, the device for storing, and the reflecting mirror so that when the reflecting mirror is at the first position, for each frame, a density of an image at the printing position is measured and printing conditions of the image are determined based on the results of measurement and are stored, and thereafter, the reflecting mirror is moved to the second position and, for each frame, an image at the printing position is printed onto the photographic printing paper under stored printing conditions.

14 Claims, 3 Drawing Sheets

PHOTOGRAPHIC PRINTING APPARATUS AND METHOD

BACKGROUND OF THE INVENTION

1. Field of the Invention

The present invention relates to a photographic printing apparatus which prints images which are recorded on a film.

2. Description of the Related Art

In order to effect correction of the printing conditions of an image recorded on a film and the like, a photographic printing apparatus is provided with a simulator function for displaying the image on a display. In this type of a photographic printing apparatus, the image recorded on the film is projected so that the image is displayed on the screen of the display before being printed onto photographic printing paper.

Conventionally, a two light source method has been used in which a light source for printing and a light source for projecting the image recorded on the film are provided separately. Light which is irradiated from the light source for projecting and which passes through the image enters a projecting element. Further, an inclined photometric method has been used in which photometry and projecting are effected at an angle with respect to the image surface of the image. However, in this method, it is necessary to provide the second light source. Therefore, the cost is high, and the additional light source occupies space. Further, the direction in which the film is conveyed cannot easily be turned 90°. The degrees of freedom in arranging the conventional photosensitive printing apparatus are thereby reduced. Moreover, using an inclined photometric method results in drawbacks such as warping of the image displayed on the display, and the like.

A method has been considered in which light irradiated from a light source and passed through an image is reflected by a half mirror which is disposed so as to be fixed on the printing optical path. Another method has been known in which light irradiated from a light source and passed through an image is reflected by a total reflection mirror which is moved so as to be disposed on the optical path for printing during photometry and is withdrawn from the printing optical path during printing when one image is printed. The light reflected by the half mirror or the total reflection mirror enters a projecting element to be photometrically measured. However, when the half mirror is used, an optical disturbance may be created. Further, when the total reflection mirror is used, the time required to move the total reflection mirror is added to the entire processing time, and printing processing cannot be effected at high speed. It is hazardous to move the total reflection mirror rapidly in order to shorten the processing time.

The applicant solved the above-described drawback in Japanese Patent Application Laid-Open No. 2-278248 which discloses a photographic printing apparatus in which printing processing time is shortened. In this apparatus, when a film of 135 size or less is printed, a half prism is attached to a zoom lens inserted into the printing optical path so as to guide a portion of the light passing through the photographic film to a projecting element. When a film which is larger than size 135 is printed, a total reflection mirror is inserted into the printing optical path and the light is reflected to a projecting element. A total reflection mirror is used because a large half prism is expensive.

In this way, when films of 135 size or less which have many images to be processed are successively printed, a portion of the light is reflected to the projecting element by the half prism. Therefore, there is no member moved into the optical path, and printing processing can be effected quickly and economically.

When a film larger than 135 size, e.g., a brownie size film, is printed, the total reflection mirror must be inserted into and withdrawn from the printing optical path each time a frame is printed. Since there are few images to be processed in films which are larger than 135 size, the time involved in moving the total reflection mirror does not greatly effect the total processing time. Accordingly, even though the total reflection mirror is moved comparatively slowly in order to maintain stability, there is no great increase in the processing time.

However, compared with a method in which only a half-mirror or only a total reflection mirror are used in the photographic printing apparatus, it is necessary to adjust not only the optical position of the mirror but also that of the half prism. Therefore, the work involved in adjusting the optical system of the photographic printing apparatus is complicated. Further, there is a drawback in that the cost of the photographic printing apparatus is high because the half prism is expensive.

SUMMARY OF THE INVENTION

An object of the present invention is to provide a photographic printing apparatus in which printing processing can be effected at a low cost and at high speed.

Another object of the present invention is to provide a method of photographic printing in which printing processing can be effected at a low cost and at high speed.

The present invention is a photographic printing apparatus including conveying means for conveying a film on which images are recorded; measuring means for measuring image density; determining means for determining printing conditions based on a measured image density; storing means for storing the printing conditions; display means for simulating an image to be printed onto a photographic printing paper based on results of measurement of the measuring means, and for displaying a simulated image; light reflecting means movable between a first position, and a second position, at the first position the light reflecting means guides light, which is irradiated from a light source and which passes through a film disposed at a printing position, to the measuring means, and at a second position, of the light reflecting means the image of the film at the printing position is printed onto to the photographic printing paper; control means for controlling the conveying means, the measuring means, the determining means, the storing means and the light reflecting means so that a density of the image at the printing position is measured at the first position of the light reflecting means and the printing conditions of the image are determined based on results of measurement and are stored, and after, the light reflecting means is moved to the second position from the first position, the image at the diem at the printing position is printed onto the photographic printing paper under stored printing conditions. "Printing position" refers to the position which is located on the conveying path of the negative film and through which light emitted from the light source passes.

When, for example, a single film upon which a plurality of images is recorded is subject to printing processing by the apparatus of the present invention, it suffices to move the light reflecting means only twice during the operation of the photographic processing apparatus. Therefore, the amount of time involved in moving the light reflecting means has an extremely small effect on the processing time. Even when the light reflecting means is moved slowly in order to maintain stability, printing Processing can be effected at high speed.

It is preferable to measure the image density and determine the printing conditions for each frame by conveying the film frame by frame. It is preferable for the control means to control the conveying means so that the conveying means conveys the film in one direction when the light reflecting means is at the first position, and so that the conveying means conveys the film in a direction opposite to the one direction when the light reflecting means is at the second position. In this way, there is no need to set the film twice at the photographic printing apparatus. Therefore, the processing time is shortened, and the work which is to be done by the operator is reduced.

It is preferable that the control means controls the conveying means, the measuring means, the determining means, the storing means, and the light reflecting means so that when the light reflecting means is at the first position, for each frame, the density of the image at the printing position is measured; printing conditions of the image are determined based on results of measurement, the printing conditions are corrected based on an image displayed on the display means, and the corrected printing conditions are stored. The light reflecting means is moved to the second position, and for each frame, the image at the printing position is printed onto the photographic printing paper under the stored printing conditions. Further, it is preferable that the film position is corrected based on the image displayed on the display means, the corrected film position is stored, and the film is printed at the stored film position. By using the display means to observe the film position and the image conditions, printing can be effected better and more reliably.

A plurality of image frames of a film may be simultaneously displayed on the display means so that the printing conditions of the image frames may be corrected simultaneously.

In the present invention, a mirror having high reflectance, e.g., an inexpensive total reflection mirror, can be used as the light reflecting means. The photographic printing apparatus of the present invention can be manufactured at a low cost compared with an apparatus in which an expensive half prism or the like is used. With the present invention, there is no need for troublesome optical position adjustment which is necessary for other reflecting means such as the half prism and the like. Further, compared with a case in which a half mirror or a half prism is disposed on the optical path during printing processing, in the present invention there is nothing other than the lens between the photographic printing paper and the film. Therefore, the optical performance of the apparatus is not adversely effected.

Another aspect of the present invention provides a photographic printing method. In this method when a light reflecting means is at a first position, at which the light reflecting means guides light, which is irradiated from a light source and which passes through a film at a printing position, to a measuring means, an image density for each frame is measured. Printing conditions for each frame are determined based on the respective image density and are stored while a film is being conveyed frame by frame. The light reflecting means moves from the first position to a second position at which the light reflecting means guides light, which passes through the film, to a photographic printing paper. Each image is printed onto the photographic printing paper under respective stored printing conditions while the film is being conveyed frame by frame. An image to be printed onto the photographic printing paper based on results of measurement of the image density is simulated, and the simulated image is displayed on a display means.

DESCRIPTION OF THE PREFERRED EMBODIMENTS

Figure 1:
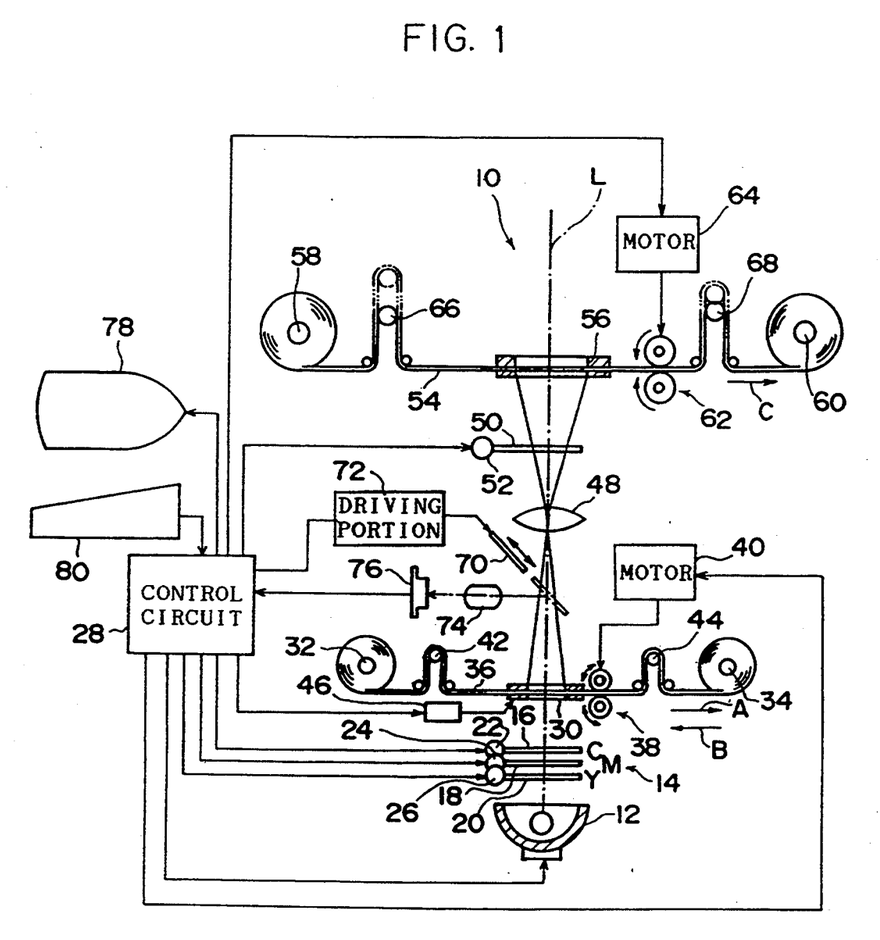
FIG. 1 is a schematic structural view of a photographic printing apparatus relating to the present embodiment.

An embodiment of the present invention will be described in detail hereinafter with reference to the accompanying drawings. FIG. 1 illustrates a photographic printing apparatus 10 relating to the present invention.

The photographic printing apparatus 10 is equipped with a light source 12 formed by a halogen lamp and a reflector. A light-adjusting filter portion 14 equipped with cut-off filters 16, 18, 20, which are respectively C (cyan), M (magenta), and Y (yellow), is disposed above the light source 12. Each of the cut-off filters 16, 18, 20 is moved independently by respective drivers 22, 24, 26 in a direction of being inserted into the printing optical path L through which light irradiated from the light source 12 passes, and in a direction of being withdrawn from the printing optical path L. The drivers 22, 24, 26 of the light-adjusting filter portion 14 are connected to a control circuit 28. The cut-off filters 16, 18, 20 are respectively moved in accordance with signals from the control circuit 28.

A negative mask 30 is disposed on the printing optical path L above the light-adjusting filter portion 14 and an unillustrated light diffusing box located between the negative mask 30 and the light-adjusting filter portion 14. A shaft 32 and a shaft 34 are disposed respectively at sides of the negative mask 30. One end of a negative film 36 set in the photographic printing apparatus 10 is wound in a roll around the shaft 32, and the other end of the negative film 36 is wound in a roll around the shaft 34. The negative film 36 can be interposed between and fixed at the negative mask 30. The negative film 36 has a plurality of images exposed thereon along the longitudinal direction. After the negative film 36 has undergone developing, fixing, washing, and drying processing, the negative film 36 is set in the photographic printing apparatus 10.

A pair of conveying rollers 38 is disposed between the negative mask 30 and the shaft 34 such that the negative film 36 is interposed between the pair of conveying rollers 38. The conveying rollers 38 are rotated by a driving force transmitted thereto from a motor 40, and convey the negative film 36 in a predetermined direction (e.g., the direction of arrow A in FIG. 1) and in the direction opposite to the predetermined direction (e.g., the direction of arrow B in FIG. 1). The motor 40 is connected to the control circuit 28, and the driving of the motor 40 is started by the control circuit 28. When an image recorded on the negative film 36 reaches the negative mask 30, i.e., when an image is positioned at the printing position, the motor 40 is controlled so that the conveying of the negative film 36 stops.

A tension roller 42 is disposed between the shaft 32 and the negative mask 30. The negative film 36 set at the photographic printing apparatus 10 is trained around the tension roller 42. In the same way, a tension roller 44 is disposed between the conveying rollers 38 and the shaft 34, and the negative film 36 is trained around the tension roller 44. The tension rollers 42, 44 are urged by an unillustrated urging means in a direction of moving away from the conveying path of the negative film 36 so as to maintain the tension substantially constant when the negative film 86 is being conveyed.

A driving device 46 is connected to the negative mask 30. The surface area of the masking area which masks the negative film 36 can be varied by a driving device 46. The driving device 46 is connected to the control circuit 28. The driving device 46 is driven so that the size of the masking area of the negative mask 30 substantially coincides with the size of the image frame recorded on the negative film 36 set in the photographic printing apparatus 10.

A lens 48 and a black shutter 50 are disposed successively above the negative mask 30 on the printing optical path L. The black shutter 50 is opened and closed by a driver 52 so as to allow light on the printing optical path L to pass through or so as to interrupt the light. The driver 52 is connected to the control circuit 28 such that operation of the driver 52 is controlled by the control circuit 28.

The conveying path of a photographic printing paper 54 is disposed above the black shutter 50. A paper mask 56 is disposed at the position at which the conveying path of the photographic printing paper 54 and the printing optical path L intersect. A shaft 58 and a shaft 60 are provided at respective ends of the conveying path of the photographic printing paper 54 which is interposed between the paper mask 56. One end of the photographic printing paper 54 is wound in a roll around the shaft 58, and the other end of the photographic printing paper 54 is wound in a roll around the shaft 60. The photographic printing paper 54 can be interposed between and fixed at the paper mask 56. When the black shutter 50 is opened, the light passes through the negative film 36 positioned at the printing position, passes along the printing optical path L and reaches the paper mask 56. The image recorded on the negative film 36 is printed onto the area of the photographic printing paper 54 positioned at the paper mask 56.

A pair of conveying rollers 62 is disposed between the paper mask 56 and the shaft 60 such that the photographic printing paper 54 is interposed between the pair of conveying rollers 62. The conveying rollers 62 are rotated by a driving force transmitted thereto by a motor 64, and convey the photographic printing paper 54 in the direction of arrow C in FIG. 1. In this way, the photographic printing paper 54 is pulled from the shaft 58 and is wound around the shaft 60. The motor 64 is connected to the control circuit 28 such that the driving of the motor 64 is controlled by the control circuit 28. Tension rollers 66, 68 are disposed respectively between the shaft 58 and the paper mask 56, and between the conveying rollers 62 and the shaft 60. The photographic printing paper 54 is trained around the tension rollers 66, 68. The tension rollers 66, 68 are urged by an unillustrated urging means in a direction of moving away from the conveying path of the photographic printing paper 54 so as to maintain the tension substantially constant when the photographic printing paper 54 is being conveyed.

A total reflection mirror 70 serving as a light reflecting means is disposed in a vicinity of the lens 48 used for printing. The total reflection mirror 70 is movable between a first position, which is illustrated by the imaginary line in FIG. 1 and at which the total reflection mirror 70 is inserted into the printing optical path L, and a second position, which is illustrated by the solid line in FIG. 1 and at which the total reflection mirror 70 is withdrawn from the printing optical path L. When the total reflection mirror 70 is moved to the first position, the light passing along the printing optical path L is reflected to the side of the printing optical path L. A zoom lens 74 used for photometry and a two-dimensional image sensor 76 serving as a measuring means are disposed on the optical path along which the light reflected by the total reflection mirror 70 travels. The light reflected by the total reflection mirror 70 passes through the zoom lens 74 used for photometry and enters the image sensor 76. The image sensor 76 is connected to the control circuit 28. Light entering respective areas on the light-receiving surface of the image sensor 76 is converted into respective electric signals which are output to the control circuit 28.

A display 78 and a keyboard 80 are connected to the control circuit 28. When the total reflection mirror 70 is at the first position and a specific image frame of the negative film 36 is positioned at the printing position, the light passing through the specific image frame of the negative film 36 enters the image sensor 76. The signals input to the control circuit 28 from the image sensor 76 are subject to a process, which will be described later, in the control circuit 28. The signals are converted into video signals and are output to the display 78. An image corresponding to the input video signals is displayed on the display 78. An operator corrects the exposure data based on the display. Further, the operator inputs parameters, such as size of the negative film and the like, through the keyboard 80.

Figure 2A:
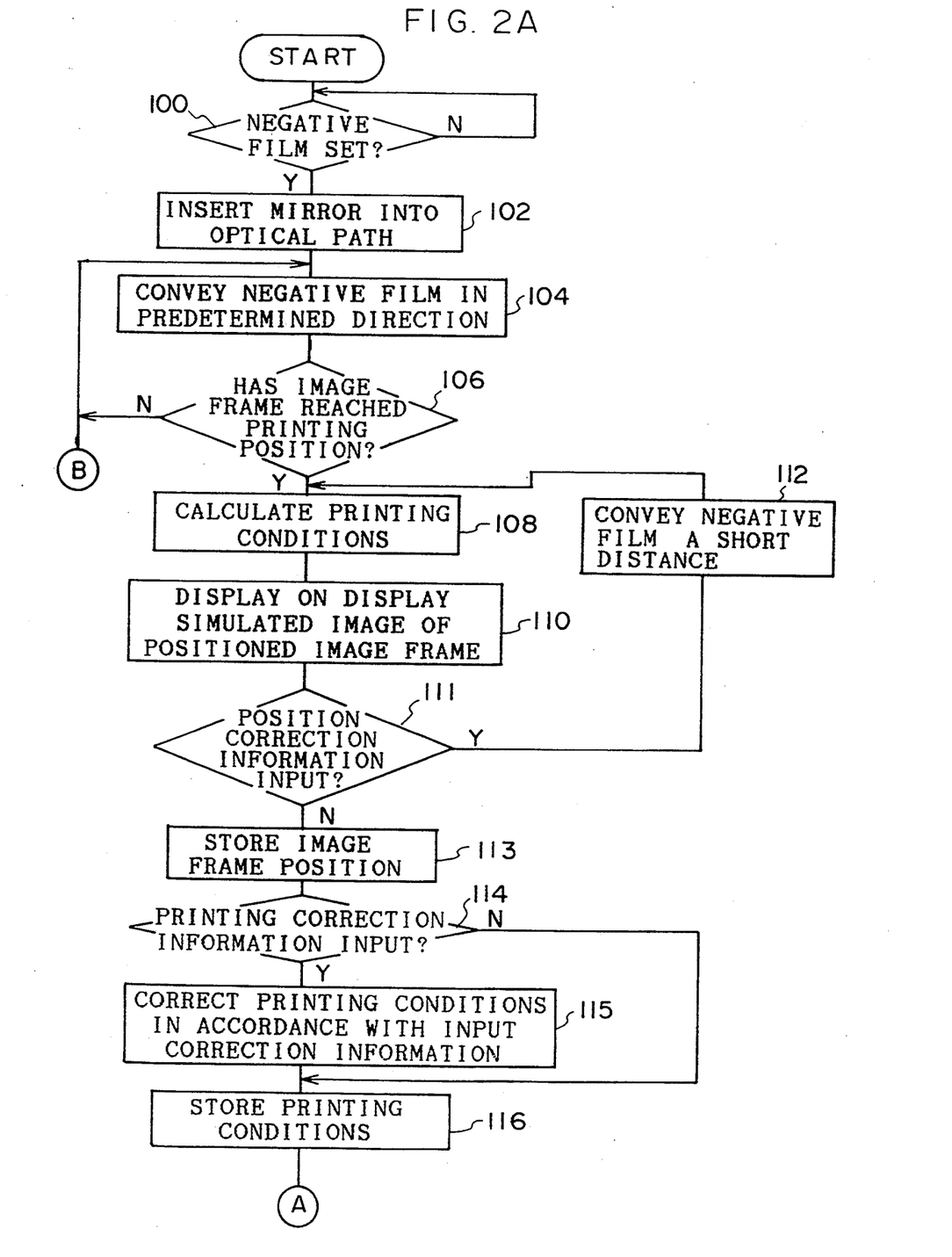
FIGS. 2A and 2B are flowcharts describing operation of the present embodiment.
Figure 2B:
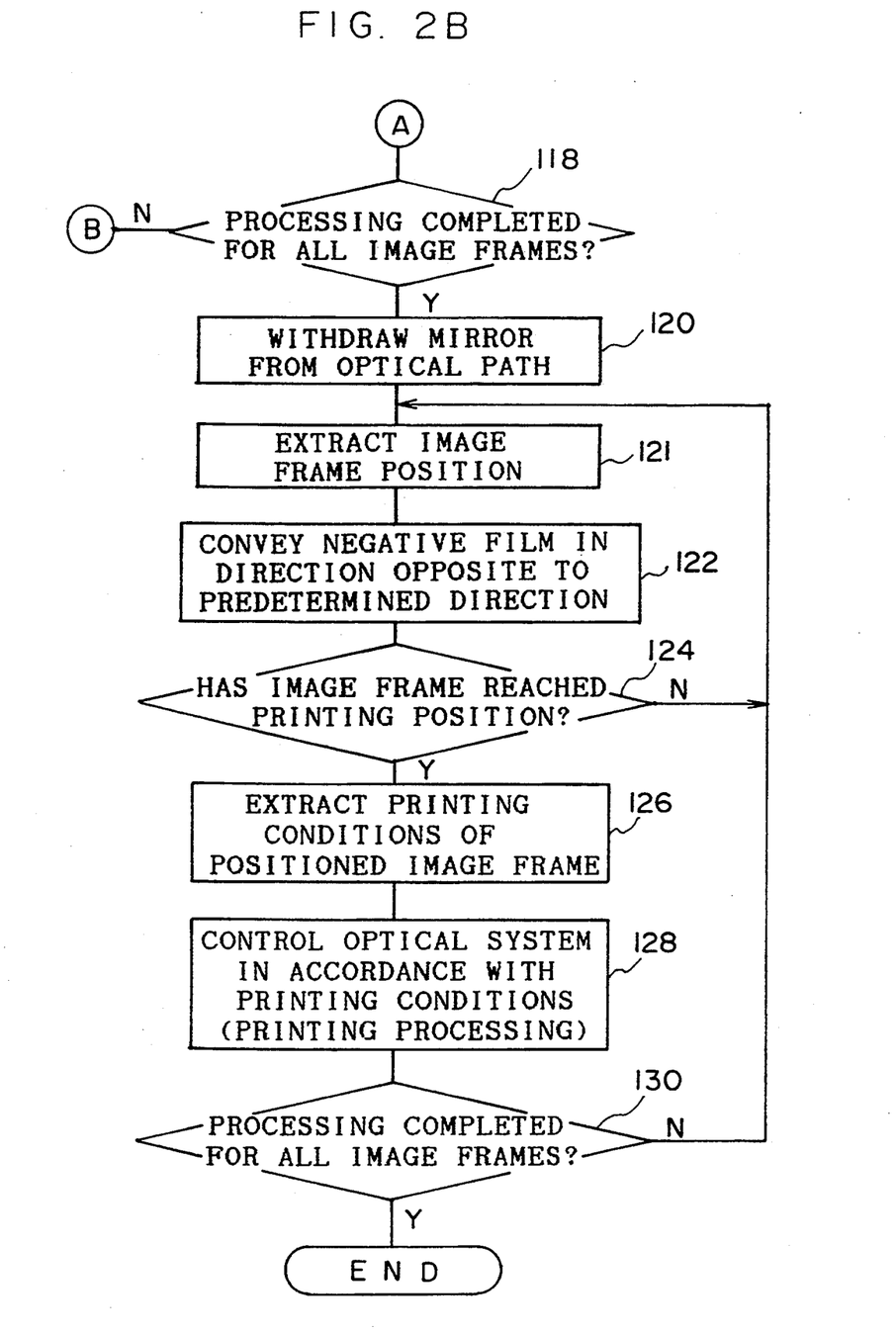

An example of the operation of the apparatus of the present invention will be described with reference to the flowcharts in FIGS. 2A and 2B. In step 100, a determination is made as to whether the negative film 36 is set in the photographic printing apparatus 10. When the negative film 36 is set in the photographic printing apparatus 10, the answer to the determination in step 100 is "Yes". In step 102, regardless of the size of the negative film 36, the full reflection mirror 70 is moved by a driving portion 72 to the first position on the printing optical path L. In this way, the light which is irradiated from the light source 12 and passes through the negative film 36 enters the image sensor 76 via the zoom lens 74. At this time, the driving device 46 is driven so that the size of the masking area of the negative mask 30 substantially coincides with the size of the image frame of the negative film 36 which is set in the photographic printing apparatus 10.

In step 104, the motor 40 is driven, and the conveying of the negative film 36 in a predetermined direction (the direction of arrow A in FIG. 1) begins. In step 106, a determination is made as to whether an image frame recorded on the negative film 36 has reached the printing position corresponding to the negative mask 30. If the answer to the determination in step 106 is "No", the process returns to step 104. The conveying of the negative film 36 continues until the answer to the determination in step 106 is "Yes".

When the image frame of the negative film 36 reaches the printing position, the driving of the motor 40 is stopped, and the process moves to step 108. In step 108, the image density is calculated based on the signals input from the image sensor 76, and printing conditions are calculated based on the difference between the calculated image density and the image density of a reference negative film stored in advance. In subsequent step 110, the print image to be printed under the aforementioned printing conditions is simulated, and video signals representing the simulated image are formed and are output to the display 78. In this way, a simulated image of an image which would be formed by printing the image frame, which has reached the printing position, under the aforementioned printing conditions is displayed on the display 78.

The image sensor 76 is disposed on the optical path along which the light reflected by the total reflection mirror 70 passes. Therefore, warping of the simulated image, which is formed by the signals input from the image sensor 76 being processed and which is displayed on the display 78, is small compared to warping of a simulated image when the inclined photometric method is used.

In step 111, a determination is made as to whether information for correcting the position at which the negative film 36 is stopped has been input. The operator refers to the image displayed on the display 78 and judges whether the image frame which has reached the printing position is correctly positioned thereat. If the operator judges that the image frame is not correctly positioned, he/she inputs via the keyboard 80 the amount of correction for correcting the position at which the negative film 36 is stopped. When the amount of correction is input, the answer to the determination in step 111 is "Yes", and in step 112 the negative film 36 is conveyed a short distance in accordance with the input amount of correction. Next, the process returns to step 108, and steps 108 through 112 are repeated until the answer to the determination in step 111 is "NO".

When the answer to the determination in step 111 is "No", the image frame is positioned correctly at the printing position. The detection of the image frame position is completed, and the image frame position confirmed. The process moves to step 113 where the confirmed image frame position is stored. In subsequent step 114, a determination is made as to whether the calculated correction information for correcting the printing conditions calculated in step 108 has been input. After the image frame has been correctly positioned at the printing position, the operator refers to the image displayed on the display 78, and judges whether it is necessary to correct the printing conditions. If the operator judges that it is necessary to correct the printing conditions, he/she uses the keyboard 80 to input information for correcting the printing conditions.

When the correction information has been input, the answer to the determination in step 114 is "Yes", and in step 11E the printing conditions are corrected in accordance with the correction information which has been input. The process then moves to step 116. Further, when no correction information is input, step 115 is not executed, and the process moves to step 116. In step 116, the printing conditions, which are determined as described above, of the positioned image frame are stored in a storing device.

A determination is made in step 118 as to whether processing has been completed for all of the image frames recorded on the negative film 36. If the answer to the determination in step 118 is "No", the process returns to step 104, and steps 104 through 118 are repeated until the answer to the determination in step 118 is "Yes". In this way, the processes of displaying the image frame as an image on the display 78, inputting correction information as occasion demands, determining the printing conditions, and storing the printing conditions are repeated for all of the image frames recorded on the negative film 36. When the answer to the determination in step 118 is "Yes", the process moves to step 120.

From step 120 on, the image frames recorded on the negative film 36 are successively printed onto the photographic printing paper 54. Namely, in step 120, the driving portion 72 is instructed to move the total reflection mirror 70 to the second position at which the total reflection mirror 70 is withdrawn from the printing optical path L. In this way, the light irradiated from the light source 12 passes through the negative film 36, passes through the lens 48 for printing, and is guided to the black shutter 50. At this time, the black shutter 50 is closed. In subsequent step 121, among the image frame positions stored in step 113, data for image frame position of the image frame which is to be printed next is extracted from the stored information.

In step 122, the motor 40 is driven so that the direction of transport of the negative film 36 is reversed, and the conveying of the negative film 36 in the direction opposite the predetermined direction begins (the negative film 36 is conveyed in the direction of arrow B in FIG. 1). In step 124, a determination is made, based on the extracted data for image frame position, as to whether an image frame recorded on the negative film 36 is positioned at the printing position corresponding to the negative mask 30. In this way, even in cases in which, for example, the spaces between the image frames are not equal, the image frame can be automatically and correctly positioned at the printing position. If the answer to the determination in step 124 is "No", the process returns to step 122, and the conveying of the negative film 36 continues until the answer to the determination in step 124 is "Yes".

When the image frame of the negative film 36 is positioned at the printing position, the driving of the motor 40 is stopped, and the process moves to step 126. In step 126, the printing conditions stored in the storing device in previously-described step 116 are referred to, and the data for printing conditions corresponding to the positioned image frame are extracted from the stored information. In step 128, the optical system, i.e., the light-adjusting filter portion 14, the black shutter 50 and the like, is controlled so that the image of the positioned image frame is printed onto the photographic printing paper 54 under the extracted printing conditions. In step 130, a determination is made as to whether processing has been completed for all of the image frames recorded on the negative film 36.

If the answer to the determination in step 130 is "No", the process returns to step 121, and steps 121 through 130 are repeated until the answer to the determination in step 130 is "Yes". In this way, the negative film 36 is conveyed in the direction opposite to the first direction, and the images of the image frames are successively printed onto the photographic printing paper 54 at the stored printing conditions.

In the present embodiment, regardless of the size of the negative film, the total reflection mirror 70 is inserted into the printing optical path L, and the printing conditions for each image frame are successively determined as the negative film 36 is conveyed in the predetermined direction. Thereafter, the total reflection mirror 70 is withdrawn from the printing optical path L and the images of each of the image frames are printed onto the photographic printing paper 54 while the negative film 36 is being conveyed in the direction opposite to the predetermined direction. Therefore, the total reflection mirror 70 is moved only two times when all of the images recorded on one roll of the negative film 36 are printed onto the photographic printing paper 54. As a result, the printing processing time is not greatly increased due to the time involved in moving the total reflection mirror 70. Even if the total reflection mirror 70 is moved slowly in order to maintain stability, printing processing can be effected in a short time regardless of the size of the negative film In the present embodiment, the total reflection mirror 70 is used as the reflecting means rather than an expensive half prism or the like. Therefore, the photographic printing apparatus can be manufactured at a low cost. Further, there is no need to adjust the optical position, as there is with the half prism or the like. Moreover, during printing processing, the total reflection mirror is withdrawn from the printing optical path L, and there is nothing other than the lens between the photographic printing paper 54 and the film. Compared to a case in which a half mirror or a half prism or the like is used, the expected optical functions can be guaranteed in the present invention.

The present invention may be applied to a case in which a simulator function is added to a photographic printing apparatus not equipped with this function. With a structure such as that of the above-described embodiment in which, during printing processing, the total reflection mirror is withdrawn from the printing optical path L, there is no need to change the optical system, i.e., the lens 48 used for printing and the like.

The above-described embodiment employs a one light source method in which the light irradiated from the light source 12 is used for printing and for projecting. Therefore, the photographic printing apparatus 10 can be manufactured at a low cost, and the space which the light source occupies can be made smaller. Further, there are many degrees of freedom in arranging the photographic printing apparatus 10, such as turning the negative film 36 conveying direction 90°.

A plurality of simulated images of image frames may be simultaneously displayed on the display 78. In this way, the operator can inspect the overall trends of the images recorded on the negative film 36 and can correct the printing conditions.

Further, in the present embodiment, the image frames recorded on the negative film 36 are moved in one direction and then in the direction opposite thereto. Namely, the detection of the image frame position and the determination of the printing conditions is effected as the negative film 36 is conveyed in one direction, and printing processing is effected as the negative film 36 is conveyed in the opposite direction. However, the present invention is not limited to the same. The photographic printing apparatus may be structured such that the negative film 36 is conveyed in only a single direction. In this case, the negative film 36 is set twice at the photographic printing apparatus 10. The detection of the image frame position and the determination of the printing conditions is effected when the negative film 36 is set for the first time, and printing processing is effected when the negative film 36 is set for the second time.

In the above-described present invention, printing processing can be effected at a low cost and at high speed.

What is claimed is:

1. A photographic printing apparatus comprising:
   conveying means for conveying a film on which images are recorded;
   measuring means for measuring image density;
   determining means for determining printing conditions for each image based on a measured image density;
   storing means for storing said printing conditions;
   display means for simulating an image to be printed onto a photographic printing paper based on results of measurement of said measuring means, and for displaying a simulated image;
   light reflecting means movable between a first position and a second position, such that
   at said first position said light reflecting means guides light, which is irradiated from a light source and which passes through said film disposed at a printing position, to said measuring means, and
   at said second position of said light reflecting means the image of said film at the printing position is printed onto the photographic printing paper; and
   control means for controlling said conveying means, said measuring means, said determining means, said storing means, and said light reflecting means so that
   densities of a plurality of images of said film at the printing position are measured with said light reflecting means being at said first position before said light reflecting means is moved to said second position from said first position,
   said printing conditions of said images are determined based on the results of said measurements of said densities and are stored as stored printing conditions, and
   said images of said film at the printing position are printed onto the photographic printing paper after said light reflecting means is moved to said second position from said first position, in accordance with said stored printing conditions.

2. A photographic printing apparatus according to claim 1, wherein said control means controls said conveying means, said measuring means, said determining means, said storing means, and said light reflecting means so that
   a density of an image at the printing position is measured when said light reflecting means is at said first position,
   printing conditions of the images are determined based on the result of the measurement of said density,
   if necessary the printing conditions are corrected based on an image displayed on said display means, and corrected printing conditions are stored, and
   after said light reflecting means is moved to said second position and, for each frame, an image at the printing position is printed onto the photographic printing paper under said stored printing conditions.

3. A photographic printing apparatus according to claim 1 wherein said light reflecting means is a total reflection mirror.

4. A photographic printing apparatus comprising:
conveying means for conveying a film on which images are recorded;
measuring means for measuring image density;
determining means for determining printing conditions for each image based on a measured image density;
storing means for storing said printing conditions;
display means for simulating an image to be printed onto a photographic printing paper based on results of measurement of said measuring means, and for displaying a simulated image;
light reflecting means movable between a first position and a second position, such that
at said first position said light reflecting means guides light, which is irradiated from a light source and which passes through said film disposed at a printing position, to said measuring means, and
with said light reflecting means being at said second position, the image of said film at the printing position is printed onto the photographic printing paper; and
control means for controlling said conveying means, said measuring means, said determining means, said storing means, and said light reflecting means so that
a density of the image at the printing position is measured with said light reflecting means being at said first position,
said printing conditions of the image are determined based on the result of said measurement of said density and are stored as stored printing conditions, and
the image of said film at the printing position is printed onto the photographic printing paper in accordance with said stored printing conditions after said light reflecting means is moved to said second position from said first position;
wherein said control means controls said conveying means so that when said light reflecting means is at said first position, said conveying means conveys said film in one direction, and when said light reflecting means is at said second position, said conveying means conveys said film in a direction opposite to said one direction.

5. A photographic printing apparatus comprising:
conveying means for conveying a film on which images are recorded;
measuring means for measuring image density;
determining means for determining printing conditions for each image based on a measured image density;
storing means for storing said printing conditions;
display means for simulating an image to be printed onto a photographic printing paper based on results of measurement of said measuring means, and for displaying a simulated image;
light reflecting means movable between a first position and a second position, such that
at said first position said light reflecting means guides light, which is irradiated from a light source and which passes through said film disposed at a printing position, to said measuring means, and
with said light reflecting means at said second position, the image of said film at the printing position is printed onto the photographic printing paper; and
control means for controlling said conveying means, said measuring means, said determining means, said storing means, and said light reflecting means so that
a density of the image at the printing position is measured at said first position of said light reflection means;
said printing conditions of the image are determined based on the result of the measurement of said density and are stored as stored printing conditions, and
the image of said film at the printing position is printed onto the photographic printing paper in accordance with said stored printing conditions after said light reflecting means is moved to said second position from said first position,
wherein said control means controls said conveying means, said measuring means, said determining means, said storing means and said light reflecting means so that
when said light reflecting means is at said first position, for each frame, a density of an image at the printing position is measured, printing conditions of the image are determined based on the results of measurement, a film position is corrected based on an image displayed on said display means, and a corrected film position is stored, and
said light reflecting means is moved to said second position, and an image at the printing position is printed onto the photographic printing paper at a stored film position.

6. A photographic printing apparatus comprising:
conveying means for conveying a film on which images are recorded;
measuring means for measuring image density;
determining means for determining printing conditions for each image based on a measured image density;
storing means for storing said printing conditions;
display means for simulating an image to be printed onto a photographic printing paper based on results of measurement of said measuring means, and for displaying a simulated image;
light reflecting means movable between a first position and a second position, such that
at said first position said light reflecting means guides light, which is irradiated from a light source and which passes through said film disposed at a printing position, to said measuring means, and
with said light reflecting means at said second position, the image of said film at the printing position is printed onto the photographic printing paper; and
control means for controlling said conveying means, said measuring means, said determining means, said storing means and said light reflecting means so that
a density of the image at the printing position is measured at said first position of said light reflecting means, said printing conditions of the image are determined based on the results of measurement and are stored as stored printing conditions, the image of said film at the printing position is printed onto the photographic printing paper in accordance with said stored printing conditions after said light reflecting means is moved to said second position from said first position, wherein:

said control means controls said conveying means, said measuring means, said determining means, said storing means, and said light reflecting means so that when said light reflecting means is at said first position, for each frame, a density of an image at the printing position is measured, printing conditions of the image are determined based on the result of measurement, the printing conditions are corrected based on an image displayed on said displayed means and the corrected printing conditions are stored, and after said light reflecting means is moved to said second position, for each frame, an image at the printing position is printed onto the photographic printing paper under said corrected printing conditions; and wherein a plurality of image frames of said film are simultaneously displayed on said display means and the printing conditions are corrected.

7. A photographic printing apparatus comprising:

conveying means for conveying a film on which images are recorded;

measuring means for measuring image density;

determining means for determining printing conditions for each image based on a measured image density;

storing means for storing said printing conditions;

display means for simulating an image to be printed onto a photographic printing paper based on results of measurement of said measuring means, and for displaying a simulated image;

light reflecting means movable between a first position and a second position, such that at said first position said light reflecting means guides light, which is irradiated from a light source and which passes through said film disposed at a printing position, to said measuring means, and with said light reflecting means at said second position the image of said film at the printing position is printed onto the photographic printing paper; and control means for controlling said conveying means, said measuring means, said determining means, said storing means and said light reflecting means so that a density of the image at the printings position is measured at said first position of said light reflecting position;

said printing conditions of the image are determined based on the results of measurement and are stored as stored printing condition, and the image of said film at the printing position is printed onto the photographic printing paper under said stored printing conditions after said light reflecting means is moved to said second position from said first position, wherein said control means controls said conveying means, said measuring means, said determining means, said storing means, and said light reflecting means so that:

when said light reflecting means is at said first position, for each frame, a density of an image at the printing position is measured, printing conditions of the image are determined based upon the results of measurement, one of a film position and the printing conditions are corrected based on an image displayed on said display means, and one of a corrected film position and corrected printing conditions are stored; and said light reflecting means is moved to said second position and, for each frame, an image at the printing position is printed onto the photographic printing paper at a stored film position and under stored printing conditions.

8. A photographic printing apparatus according to claim 7 wherein a plurality of image frames of said film are simultaneously displayed on said display means and the printing conditions are corrected.

9. A photographic printing apparatus according to claim 7 wherein said control means controls said conveying means so that when said light reflecting means is at said first position, said conveying means conveys said film in one direction, and when said light reflecting means is at said second position, said conveying means conveys said film in a direction opposite to said one direction.

10. A photographic printing method comprising steps of:

guiding light by a light reflecting means, in which the light is irradiated from a light source and passes through a film at a printing position, to a measuring means when said light reflecting means is at a first position;

measuring an image density of an image for each frame;

determining and storing printing conditions for each frame based on the respective image density;

moving said light reflecting means from said first position to a second position at which said light reflecting means guides light, which passes through said film, to a photographic printing paper; and printing each said image onto the photographic printing paper under respective stored printing conditions;

wherein an image to be printed onto the photographic printing paper based on the results of measurement of the image density is simulated, and a simulated image is displayed on a display means.

11. A photographic printing method according to claim 10 wherein one of a film position and the printing conditions are corrected based on said image displayed on said display means, and said film is conveyed frame by frame to corrected film positions, and images are printed onto the photographic printing paper under the respective corrected printing conditions.

12. A photographic printing method according to claim 10, wherein a direction in which said film is conveyed is opposite to a direction in which said film is formerly conveyed.

13. A photographic printing method according to claim 10, wherein said printing conditions are stored while said film is being conveyed frame by frame, and said image is printed onto the photographic printing paper while said film is being conveyed frame by frame.

14. A photographic printing method according to claim 10 wherein a corrected film position and corrected printing conditions are stored, and said film is conveyed frame by frame to corrected film positions, and images are printed onto the photographic printing paper under the respective corrected printing conditions.

* * * * *